United States Patent [19]

Popplewell

[11] 4,343,757

[45] Aug. 10, 1982

[54] METHOD OF MAKING GAME RACKET FRAME

[75] Inventor: Frank W. Popplewell, Saffron Walden, England

[73] Assignee: Dunlop Limited, London, England

[21] Appl. No.: 177,401

[22] Filed: Aug. 12, 1980

[30] Foreign Application Priority Data

Aug. 24, 1979 [GB] United Kingdom ............... 7929590

[51] Int. Cl.³ .................. B29C 1/14; B29D 23/02; B29D 12/00
[52] U.S. Cl. .................................. 264/221; 264/317; 264/DIG. 44; 273/73 C; 425/468
[58] Field of Search ....... 264/221, 317, 318, DIG. 44; 273/73 C; 425/468

[56] References Cited

U.S. PATENT DOCUMENTS 3,520,668  7/1970  Keefer .................................. 264/317
3,990,701  11/1976  Kim ................................. 273/73 C
4,165,071  8/1979  Frolow ............................... 264/317

Primary Examiner—James B. Lowe
Attorney, Agent, or Firm—Stevens, Davis, Miller & Mosher

[57] ABSTRACT

A method of making a games racket frame by injecting thermoplastics material into the space (13) between a fusible core (14) and a mould at a temperature above the melting point of the core. The core (14) is shaped to have locating lugs (15) to abut against the internal walls of the mould and hold the core in the desired position. The moulding is allowed to set and the core then melted out by raising the temperature sufficiently for that purpose but insufficiently to deform the moulding. The lugs (15) enable the core (14) to be located in the desired position in the mould and to resist displacement from that location during injection. The holes formed in the wall of the frame because of the abutment of lugs and mould wall can conveniently be utilized as stringing holes.

11 Claims, 8 Drawing Figures

METHOD OF MAKING GAME RACKET FRAME

This invention relates to rackets, for use in games, for example for tennis, squash and badminton, and particularly to a method of making a games racket frame by injection moulding of thermoplastics material.

In the assignee's U.S. Pat. No. 4,297,308 and Belgian Pat. No. 874,678 is disclosed a games racket frame comprising a head and a shaft, at least the head being a hollow injection moulding of thermoplastics material reinforced with short filament reinforcing material, as defined below, and in which the wall of the moulding which lies at the outer circumference of the head is joined to the wall which lies at the inner circumference of the head by an internal support means and the stringing holes in the head pass through the support means, the walls and support means of the moulding being integrally-formed. Also there is disclosed a method of making this racket frame in which at least the head is formed by injecting a thermoplastics material around a fusible core, the core having a melting point below the injection temperature and being shaped to provide internal support means between that wall of the moulding that is to lie at the outer circumference of the head and the wall of the moulding that is to lie at the inner circumference of the head, allowing the moulding to set and then raising the temperature to an amount sufficient to melt the core but insufficient to melt or deform the moulding.

By 'short filament reinforcing material' here is meant short discrete lengths of fibre reinforcing material which are randomly dispersed in the thermoplastics matrix, i.e. in contrast to continuous filament reinforcements which are usually in the form of woven fabric or braid or aligned unidirectionally in what is commonly referred to as a "warp sheet" or "warp strip".

The present invention relates to a development of the method disclosed in the aforesaid application.

Accordingly the invention provides a method of making a frame for a games racket, the frame comprising a head and a shaft, in which at least the head is formed by positioning a fusible core inside a suitable mould and injecting thermoplastics material into the space defined between the core and the internal walls of the mould, the core having a melting point below the injection temperature and being shaped to have a plurality of locating lugs which abut against the internal walls of the mould and hold the core in the desired position, allowing the moulding to set and then raising the temperature to an amount sufficient to melt the core but insufficient to melt or deform the moulding.

The lugs may abut the mould walls in recesses provided for that purpose.

The lugs enable the core to be positioned in the desired central position in the mould and may be provided to assist location in directions parallel to and perpendicular to the plane of stringing of the eventual racket. It will be appreciated that the use of locating lugs in contact with the walls of the mould results in holes in the finished moulding but this feature, which would normally be considered a serious disadvantage in conventional fusible core moulding techniques, may even be incorporated to cosmetic and practical advantage in the present invention.

In one embodiment of the invention lugs are positioned to correspond to both the inside and outside of the moulded head loop and can coincide with the desired positions of the stringing holes, the holes thereby being automatically provided in the moulding. These lugs can be shaped to provide contoured edges to the stringing holes so that the possibility of the edges of the holes cutting the string is reduced. In this embodiment it may be found desirable to form the core with holes running through it so that solid pillars are formed inside the hollow moulding as internal reinforcements, the pillars being positioned intermediate the positions of the stringing holes.

In another embodiment the hollow moulded product may have internal support means in the form of a centrally-disposed row of hollow pillars, each pillar extending from the wall at the outer circumference to the wall at the inner circumference of the head loop. This is achieved during the injection moulding stage by positioning pins in the injection mould to pass through holes formed in the core, the pins being of smaller diameter than the holes whereby the plastics material can flow around the pins to form the walls of the pillars. Thus the pillars are integrally moulded. The racket strings can conveniently pass through the hollow pillars and hence in this embodiment the positioning of the pillars corresponds to that of the desired stringing hole locations.

In yet another embodiment, the core may be shaped to provide an integrally-moulded support means in the form of a series of projections extending inwardly from the sidewalls of the frame.

In another embodiment, lugs are formed on the core, which may be additional to any lugs described above and are so positioned that they lie, when the core is positioned in the mould, at the opposite side of the core to the injection ports. The latter are preferably on the inside of the head loop of the frame and hence in this embodiment there is preferably a lug adjacent, but on the opposite side of the core to, each injection port. The resistance to displacement of the core during the moulding step is thereby maximized and hence the possibility of non-uniform mouldings is reduced. Thus in a typical example, where there are three injection ports, say one at the top of the head loop and one on each side in the shoulder area, there will be three corresponding lugs, one in each of the three positions. It may, however, be found desirable to have additional anti-displacement lugs on the side of the core corresponding to the outside wall of the head loop. (Although the lugs just described have been referred to as "anti-displacement lugs" to emphasise their particular use in combatting the injection pressures, it will be appreciated that all the lugs utilized in the present invention have a dual function of location and anti-displacement action).

These anti-displacement lugs on the side of the core corresponding to the outside wall of the head loop are preferably of conical or hemispherical shape with the apex or pole respectively outermost and it is preferred that their height from base to apex or pole be not greater than the width (e.g. diameter) of their base. Suitable dimensions for such conical lugs for use in the manufacture of a tennis racket are, for example, about 4 mm width, i.e. diameter at their base, and about 3 mm height.

The core is preferably of fusible metal although other low melting point materials could be used. Suitable metals include, for example, Wood's metal (which is an alloy of lead, tin, bismuth and cadmium) and the commercially available types sold under the trade names Cerrobend (whose melting point is about 70° C.), Cerrocast (160°–170° C.) and Cerromatrix (165°–175° C.).

(Cerrobend, Cerrocast and Cerromatrix are all Registered Trade Marks).

The core may be made, for example, by gravity-casting or diecasting, the latter being preferred.

The basic principle involved in using the fusible core is that although its melting point is lower than the temperature achieved in the injection moulding cycle, due to the thermal conductivity of the core the moulding can be effected before the metal reaches its melting point. Alternatively the core can be cooled by heat exchange to prevent its melting. Once the moulded frame has set, the temperature can be raised sufficiently to melt the core but insufficiently to melt or distort the moulding.

The transverse sectional shape of the frame may be any desired shape, for example circular, oval or rectangular. The latter is preferred as its box-like section can give very high stiffness and strength to weight ratios. It is found advantageous to form in the outer face of the wall of the frame which is to lie on the outer circumference of the head a longitudinally extending groove or channel to recess the strings of the racket and safeguard them from abrasion. The transverse sectional shapes referred to immediately above, therefore, include those shapes when such a groove or channel is incorporated.

Suitable thermoplastic materials from which the frame may be moulded include polyamides, polycarbonate, acrylonitrile-butadiene-styrene (ABS), acetal resins and poly(phenylene oxide) (PPO). (So-called 'modified' grades of PPO are now commercially available that are especially designed for injection-moulding applications.

The plastics material used is preferably reinforced with glass fibres or carbon fibres. Carbon fibres are the preferred reinforcing means and injection mixtures containing from 10% to 40% by weight of carbon fibre are especially preferred. Mixtures of glass and carbon fibres may also be used.

The wall thickness of the hollow frame of the invention need not be the same throughout and in fact the ability to vary the thickness may be a useful advantage. Zones of greater or lesser thickness may be utilized in order to optimise the required strength/weight and balance characteristics. For example, the wall thickness may be increased in the shoulder areas of the frame where considerable stress arises in use or similarly the thickness may be increased at the top of the head loop to improve impact-resistance. However, a better way of varying these characteristics around the frame is to vary the section of the frame rather than the wall thickness, particularly as there will be advantages in the moulding process and in the later annealing stages if the moulding has a substantially uniform wall thickness.

The actual dimensions of the hollow section used will depend of course on the type of racket, e.g. whether for tennis, squash or badminton, and similarly the wall thickness will be governed by strength and weight requirements for the particular game. The average skilled man of the art will readily be able to decide suitable dimensions for his particular requirements. As an example only, a useful wall-thickness may be 2 mm.

Embodiments of the invention are illustrated, by way of example only in the accompanying drawings in which.

Figure 1:
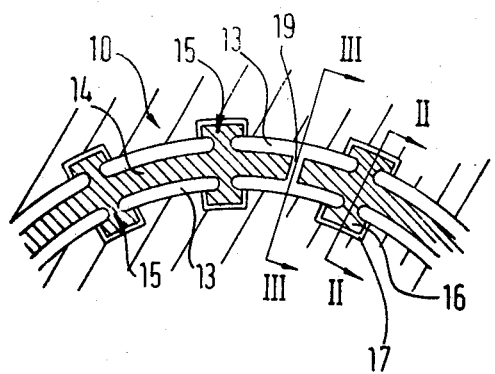
FIG. 1 is a section through a portion of a suitable mould showing the mould cavity containing one form of core with locating lugs.
Figure 2:
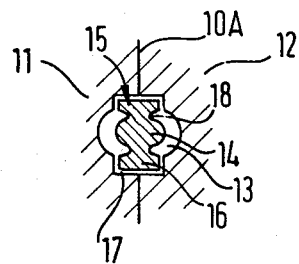
FIG. 2 is a view along line II—III of FIG. 1.
Figure 3:
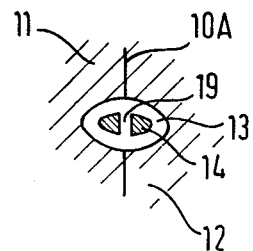
FIG. 3 is a view along line III—III of FIG. 1.

In FIGS. 1, 2 and 3 is shown in section a portion of a racket frame mould 10 corresponding to the top of the head part of the desired racket. The mould 10 comprises two mould halves or plates 11, 12 which when brought together along line 10A (FIGS. 2 and 3) define a mould cavity 13 which corresponds to the desired moulded racket frame. Inside the mould cavity is positioned a fusible core 14.

Core 14 has in-line pairs of lugs 15 spaced along its length, one lug of each pair being on the side corresponding to outside wall of the eventual racket frame and the other being on the side corresponding to the inside wall. The lugs are positioned to correspond to the desired location of the stringing apertures in the eventual racket frame. Each lug has a head portion 16, which locates in a suitably-shaped recess 17 in the wall of mould plate 11 or 12, and which is connected to the main core body by a neck 18. Neck 18 has a concave curvature whereby, when injected thermoplastics material fills cavity 13, the racket frame so formed not only has stringing apertures automatically moulded in and corresponding to lugs 15, but those apertures have contoured edges corresponding to the neck 18 concavity. Thus the stringing holes in the eventual racket wll not have abrupt or sharp edges.

Core 14 also has holes 19 at intervals along its length. These holes 19 fill with thermoplastics material during the injection and thereby allow solid reinforcing pillars to form in the moulded racket frame.

Figure 4:
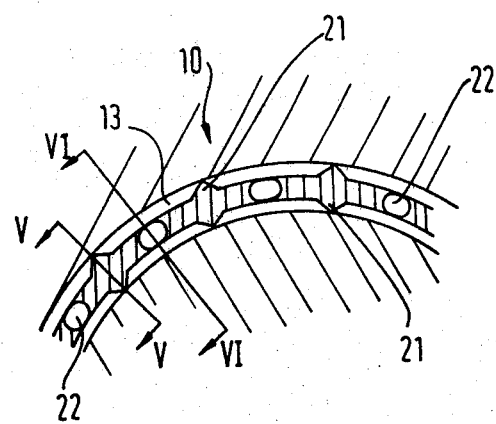
FIG. 4 is a similar section to FIG. 1 but showing a mould cavity containing an alternative form of core with locating lugs.
Figure 5:
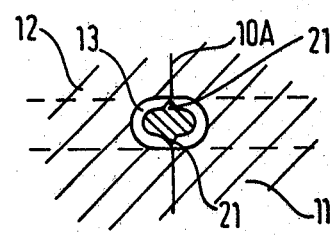
FIG. 5 is a view along line V—V of FIG. 4.
Figure 6:
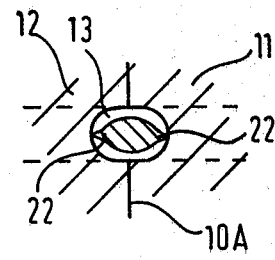
FIG. 6 is a view along line VI—VI of FIG. 4.

FIGS. 4 to 6 are similar views to FIGS. 1 to 3 respectively but show an alternative form of fusible core. As before mould 10 comprises two halves 11, 12 which join along line 10A (FIGS. 5 and 6) to define cavity 13. Fusible core 20 is positioned in cavity 13 and is provided with two sets of lugs 21 and 22.

For convenience in illustration FIGS. 2 and 5 show a space between the adjacent wall and lugs 15 or 21. In practice, as previously stated, these lugs would contact the adjacent wall.

Lugs 21 are provided in in-line pairs on opposite sides of the core and enable correct location of the core to be achieved and maintained in the plane of the strings of the eventual racket.

Lugs 22 are similarly provided in pairs and enable correct location of the core to be achieved and maintained in planes perpendicular to the plane of the strings of the eventual racket.

Both lugs 21 and 22 are of conical shape, their pointed extremities contacting the wall of the mould.

In a further embodiment, a core may be provided to have a combination of the lug types shown in FIGS. 1 to 3 and FIGS. 4 to 6.

Figures 7, 8:
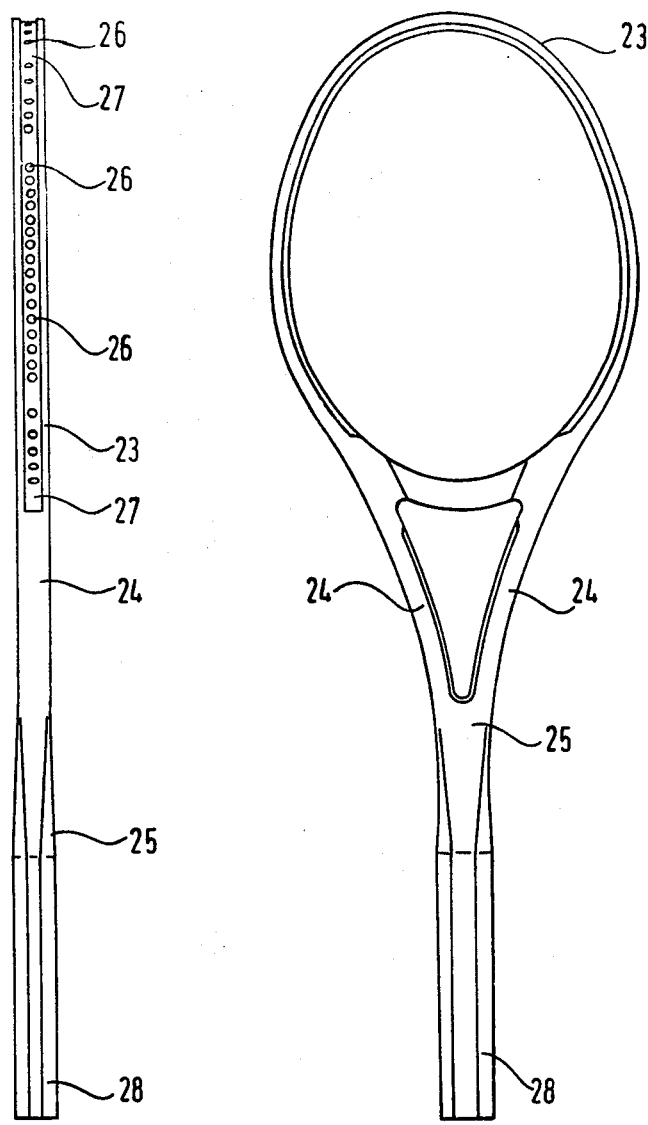
FIG. 7 is an elevation of a moulded racket frame.
FIG. 8 is a side view of the racket frame of FIG. 7.

Cores having lugs for use in the method of the present invention may be shaped to correspond to the shape of any desired racket frame. One form of possible moulded frame is shown in FIGS. 7 and 8. It has a head loop 23 for stringing and arms 24 joining the head to a shaft 25. Head loop 23 has stringing holes 26 in a recessed groove 27. A handle 28 is affixed over the end of shaft 25 remote from head 23.

Frames made by the method of the invention may be strung and finished, e.g. addition of handle and markings, by any convenient means in order to provide the finished racket.

Having now described my invention what I claim is:

1. A method of making a frame for a games racket, the frame comprising a head and a shaft, in which at least said head is formed by the method comprising:

positioning a fusible core inside a suitable mould whereby a space is defined between said core and the internal walls of the mould, said space corresponding to said head, injecting into said space thermoplastics material reinforced by short discrete lengths of fiber material randomly dispersed therein, said core having a melting point below the injection temperature, shaping said core to have a plurality of locating lugs which abut against said internal walls of the mould and hold said core in the desired position against the injection pressures, allowing the moulding to set and then raising the temperature to an amount sufficient to melt said fusible core but insufficient to melt or deform the moulding.

2. A method according to claim 1, including shaping said core to have said lugs to assist location in both the direction parallel to and in the direction perpendicular to the plane of stringing of the eventual racket.

3. A method according to claim 1, including positioning said lugs in pairs to correspond one to the inside and one to the outside wall of the eventual moulded head, each pair corresponding to the position of a desired stringing hole, whereby the stringing holes are automatically formed during the moulding operation.

4. A method according to claim 3, including shaping said lugs to provide contoured edges to said stringing holes.

5. A method according to claim 3 or 4, including forming holes through the core whereby the injected thermoplastics material forms solid pillars as internal reinforcements inside the hollow moulding, the pillars being positioned between the positions of said stringing holes.

6. A method according to any one of claims 1 to 4, including positioning at least some of said lugs to lie in the mould adjacent to but on the opposite side of said core to the injection ports of said mould.

7. A method according to claim 1, 2 or 3, including forming said lugs of conical or hemispherical shape with the apex or pole respectively outermost.

8. A method according to claim 7, including forming said lugs so that their height from base to apex is not greater than the diameter of the base.

9. A method according to claim 1, 2 or 3, including locating said lugs in recesses provided in said internal walls of the mould.

10. A method according to claim 1, 2 or 3 in which said core is made of a metallic alloy.

11. A method according to claim 10, in which said core is made by diecasting.

* * * * *